US010652456B2

United States Patent
Meindl et al.

(10) Patent No.: US 10,652,456 B2
(45) Date of Patent: May 12, 2020

(54) IMAGE SENSOR OPERATION

(71) Applicant: Intel IP Corporation, Santa Clara, CA (US)

(72) Inventors: Manfred Meindl, Linz (AT); Andreas Wasserbauer, Pettenbach (AT); Martin Aigner, Reichenthal (AT); Juergen Haas, Marchtrenk (AT); Roland Poppenreiter, Linz (AT)

(73) Assignee: Intel IP Corporation, Santa Clara, CA (US)

( * ) Notice: Subject to any disclaimer, the term of this patent is extended or adjusted under 35 U.S.C. 154(b) by 98 days.

(21) Appl. No.: 15/610,041

(22) Filed: May 31, 2017

(65) Prior Publication Data

US 2018/0352152 A1 Dec. 6, 2018

(51) Int. Cl.
| | | |
|---|---|---|
| *G06K 9/00* | (2006.01) | |
| *H04N 5/232* | (2006.01) | |
| *G06T 3/40* | (2006.01) | |
| *H04N 5/353* | (2011.01) | |
| *H04N 5/376* | (2011.01) | |
| *H04N 5/3745* | (2011.01) | |

(52) U.S. Cl.
CPC ....... *H04N 5/23229* (2013.01); *G06T 3/4053* (2013.01); *H04N 5/353* (2013.01); *H04N 5/3532* (2013.01); *H04N 5/3745* (2013.01); *H04N 5/3765* (2013.01)

(58) Field of Classification Search
None
See application file for complete search history.

(56) References Cited

U.S. PATENT DOCUMENTS

| | | | | | |
|---|---|---|---|---|---|
| 5,132,678 | A | * | 7/1992 | Morris | G09G 3/20 345/559 |
| 5,231,502 | A | * | 7/1993 | Pfister | H04N 5/372 348/250 |
| 5,608,775 | A | * | 3/1997 | Hassler | H04N 5/32 348/E5.086 |
| 5,949,483 | A | * | 9/1999 | Fossum | G11C 19/282 348/303 |
| 6,512,858 | B2 | * | 1/2003 | Lyon | H04N 5/3454 382/305 |
| 7,528,873 | B2 | * | 5/2009 | Van Blerkom | H04N 5/3532 348/296 |
| 8,994,837 | B2 | | 3/2015 | Wasserbauer et al. | |
| 9,531,967 | B2 | * | 12/2016 | Bridges | H04N 5/35554 |
| 9,909,856 | B2 | * | 3/2018 | Bridges | H04N 5/35554 |
| 2001/0005225 | A1 | * | 6/2001 | Clark | H04N 5/3454 348/302 |
| 2003/0106053 | A1 | * | 6/2003 | Sih | H04N 19/43 725/25 |
| 2010/0329554 | A1 | * | 12/2010 | Zhai | G09G 3/2003 382/167 |

(Continued)

*Primary Examiner* — Jayesh A Patel
(74) *Attorney, Agent, or Firm* — International IP Law Group, P.L.L.C.

(57) ABSTRACT

In one example, an apparatus for capturing an image includes a pixel array and a row jump register. The row jump register exposes a plurality of rows of the pixel array to the image. The rows are exposed in a non-sequential, patterned order based on a jump distance. The rows of the pixel array are read into a frame buffer memory in the non-sequential, patterned order based on the jump distance.

37 Claims, 14 Drawing Sheets

(56) References Cited

U.S. PATENT DOCUMENTS

| | | | |
|---|---|---|---|
| 2012/0281126 A1* | 11/2012 | Fossum | H04N 5/23251 |
| | | | 348/302 |
| 2013/0064022 A1* | 3/2013 | Murphy | H03M 13/275 |
| | | | 365/189.011 |
| 2013/0176453 A1* | 7/2013 | Mate | H04N 5/2355 |
| | | | 348/222.1 |
| 2013/0278802 A1* | 10/2013 | Attar | H04N 5/2226 |
| | | | 348/296 |

* cited by examiner

204

702

IMAGE SENSOR OPERATION

TECHNICAL FIELD

This disclosure relates generally to techniques for an image sensor. More specifically, the disclosure describes techniques for operating an image sensor.

BACKGROUND

Digital cameras are ubiquitous in today's society. In addition to actual cameras, they are often included in smartphones, tablets, and various computing devices. A digital camera has an image sensor that records images by generating digital values describing the light of the image. These digital values may be stored locally or remotely, and may be used to show the image on a display.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

Image capture devices, such as digital cameras, can operate using an electronic image sensor that records light values digitally. Image sensors may capture images one row of light at a time using a technique known as rolling shutter. In other words, the entire image can be captured over a brief period of time within which each row of the image is captured. The data about the image is then processed in order to reconstruct the image. However, capturing images in this way may introduce artifacts into the captured image. An artifact is a visible flaw in the image. In some cases, an artifact may be caused by something moving, such as the camera, or something in the image moving relative to the camera. To avoid artifacts, the image captured by the electronic sensor can be processed digitally, using techniques that attempt to account for motion in the image. In this way, image capture devices may generate an image that more accurately represents the original image than what is captured electronically.

Figure 1:
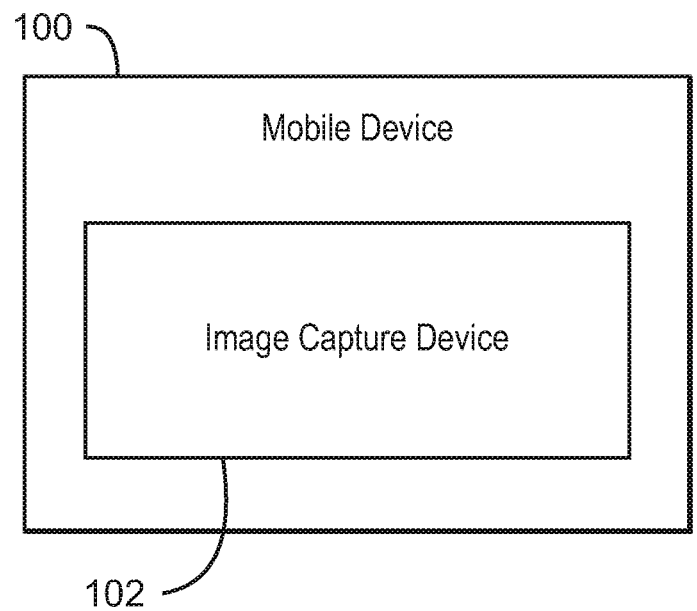
FIG. 1 is a device including an image capture device with shutter jumping.

FIG. 1 is a device 100 including an image capture device 102 with shutter jumping. The device 100 may include any computing device, such as a smartphone, tablet, laptop, desktop, Internet of Things (IoT) device, wearable computing device, and the like. The image capture device 102 may be a digital camera for still photos and video. While the image capture device 102 is shown incorporated into the device 100, the image capture device 102 may alternatively be external to the device 100. In example embodiments, the image capture device 102 is activated to take a photograph, i.e., capture an image electronically, as opposed to capturing the image chemically with film. Image capture is the process of reacting to a visual image, and documenting the appearance of the image.

Figure 2:
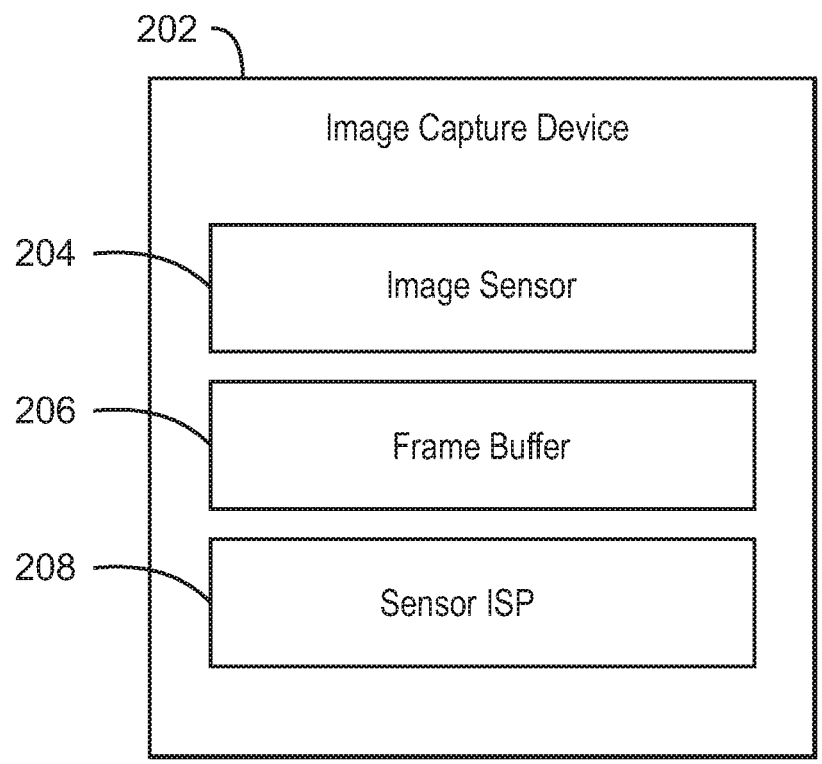
FIG. 2 is an example image capture device with shutter jumping.

FIG. 2 is an example image capture device 202 with shutter jumping. The image capture device 202 may be any device that electronically captures and reproduces still, or moving, images electronically. This can include digital cameras, smartphone cameras, webcams, and the like. The image capture device 202 includes an image sensor 204, a frame buffer memory 206, and an image signal processor (ISP) 208.

The image sensor 204 may by an electronic sensor, composed of numerous rows of pixels, the pixels representing the individual points of color and light in the image. The pixels of the image sensor 204 are capable of coding characteristics of the light that strikes them. Coding can mean that the pixel responds to light striking it by generating an electrical signal that assigns values to characteristics, such as color and brightness. The image sensor 204 may also store these characteristics in the frame buffer memory 206. The frame buffer memory 206 may be large enough to hold one frame of a still or video image. Additionally, the frame buffer memory 206 may be located on or off the image sensor 204. The image sensor 204 is described in greater detail with respect to FIG. 3.

While electronic image capture occurs within a relatively short time frame, the process is not instantaneous. Rather, the image sensor 204 exposes and reads out individual rows of light-sensitive pixels (not shown) and electronically stores data read out from each of the pixels. Some systems may read the rows out sequentially, in a process referred to as rolling shutter. With rolling shutter, the rows of the image sensor 204 are read out in sequence from top to bottom. For example, a rolling shutter image sensor with 300 rows may read out the pixel rows in order from the top row of the image sensor 204 to the last row. However, rolling shutter may introduce artifacts in the image. Accordingly, in embodiments, the rows are read out in a non-sequential, patterned order, referred to herein as a jump distance. The jump distance is a value that indicates how many physical rows apart two rows are that are read out sequentially. In some embodiments, a jump distance may be represented as an integer value that is dynamic or static. A dynamic jump distance may be derived based on a specific function. For example, the jump distance may be selected by a randomizing function. In some embodiments, the jump distance may be determined by a function based on various operating parameters, such as, whether the image is of a static scene or fast moving objects, what the lighting conditions are, whether the image sensor 204 is moving, and so on. For color sensors, e.g. with Bayer pattern, a non-regular jumping pattern may be used to improve the performance of the image reconstruction. In another alternative, there may be a series of jump distances that changes throughout the capture of a single image.

A static jump distance is a fixed distance, while a dynamic jump distance is not fixed. For example, the jump distance may be a fixed static number eight in some embodiments. Accordingly, during image capture, the image sensor 204 may read out the rows of pixels as follows: if the first row read is row zero, and the jump distance is eight; the second row read is row eight, the third row read is row 16, etc. Jump distances may vary in value, and can be larger, smaller, or derived from different functions than the examples provided here. This technique of exposing and reading out rows based on jump distance is referred to herein as shutter jumping, because embodiments operate as if a shutter opens to expose one row, then jumps the jump distance to the next row to be exposed.

The image capture device 202 includes the ISP 208, which may direct the operation of the image sensor 204. Additionally, the ISP 208 may make corrections to the captured image. As even the stillest of photographic subjects, or photographers, may move slightly while the image is captured, the captured image may not represent the image as accurately as the viewer perceives the image. Accordingly, the ISP 208 may modify the electronically-captured image to more accurately represent the image as it appears to the viewer. The ISP 208 can be a micro-processor, separate from the image sensor 204, that performs post-processing on image data in the frame buffer memory 206. Post-processing may include a range of techniques for reconstructing an image from the image captured. The ISP 208 may be a micro-processor, a multi-core processor, a system on a chip with a multi-core processor, and the like. The ISP 208 is described in greater detail with respect to FIG. 8.

To better illustrate shutter jumping in operation, Table 1 shows an example timing of the exposures and read outs in a 48 row pixel array using a hard-wired jump distance of eight. Table 1 includes the row number, and the timing of the read out command for the row. The timing of the read out is expressed as a simple sequence from zero (the first row read) to 47 (the last row read). The read out value is not meant to represent any specific timing in microseconds or any other terms. Thus, row 0 (read out=0) is the first row read out. Row 8 (read out=1) is the second row read out, repeating through every 8 rows up to row 40 (read out=5). After completing this first pass, the example sequence proceeds from row 1 (read out=6) through row 41 (read out=11), from row 2 (read out=12) through 42 (read out=17), and so on, until all the rows are read out.

TABLE 1

| Row | Read out |
|-----|----------|
| 0 | 0 |
| 1 | 6 |
| 2 | 12 |
| 3 | 18 |
| 4 | 24 |
| 5 | 30 |
| 6 | 36 |
| 7 | 42 |
| 8 | 1 |
| 9 | 7 |
| 10 | 13 |
| 11 | 19 |
| 12 | 25 |
| 13 | 31 |
| 14 | 37 |
| 15 | 43 |
| 16 | 2 |
| 17 | 8 |
| 18 | 14 |
| 19 | 20 |
| 20 | 26 |
| 21 | 32 |
| 22 | 38 |
| 23 | 44 |
| 24 | 3 |
| 25 | 9 |
| 26 | 15 |
| 27 | 21 |
| 28 | 27 |
| 29 | 33 |
| 30 | 39 |
| 31 | 45 |
| 32 | 4 |
| 33 | 10 |
| 34 | 16 |
| 35 | 22 |
| 36 | 28 |
| 37 | 34 |
| 38 | 40 |
| 39 | 46 |
| 40 | 5 |
| 41 | 11 |
| 42 | 17 |
| 43 | 23 |
| 44 | 29 |
| 45 | 35 |
| 46 | 41 |
| 47 | 47 |

Table 1 is merely provided as an example to clarify the operation of shutter jumping. It is noted that the timing of the read out may vary in different embodiments. For example, even with the same jump distance, the timing may vary if the sequence starts at a different row, e.g., row 20, instead of row 0. Also, instead of moving to row 1 for read out 6, the shutter jumping may move to row 47, and then downward after every 6 read outs. However, these are merely examples of static jump distances. As stated previously, the jump distance may alternatively be dynamic. Such as with a random number. Alternatively, the jump distance may be determined by values provided for a multiplexor on each row of the pixel sensor 204. Other alternative jump distances may be determined by exposure time, or a selected program. A selected program may be a camera shooting mode, such as for sports or portraits. There are many potential variations of how an example image sensor with shutter jumping determines the jump distance.

Figure 3:
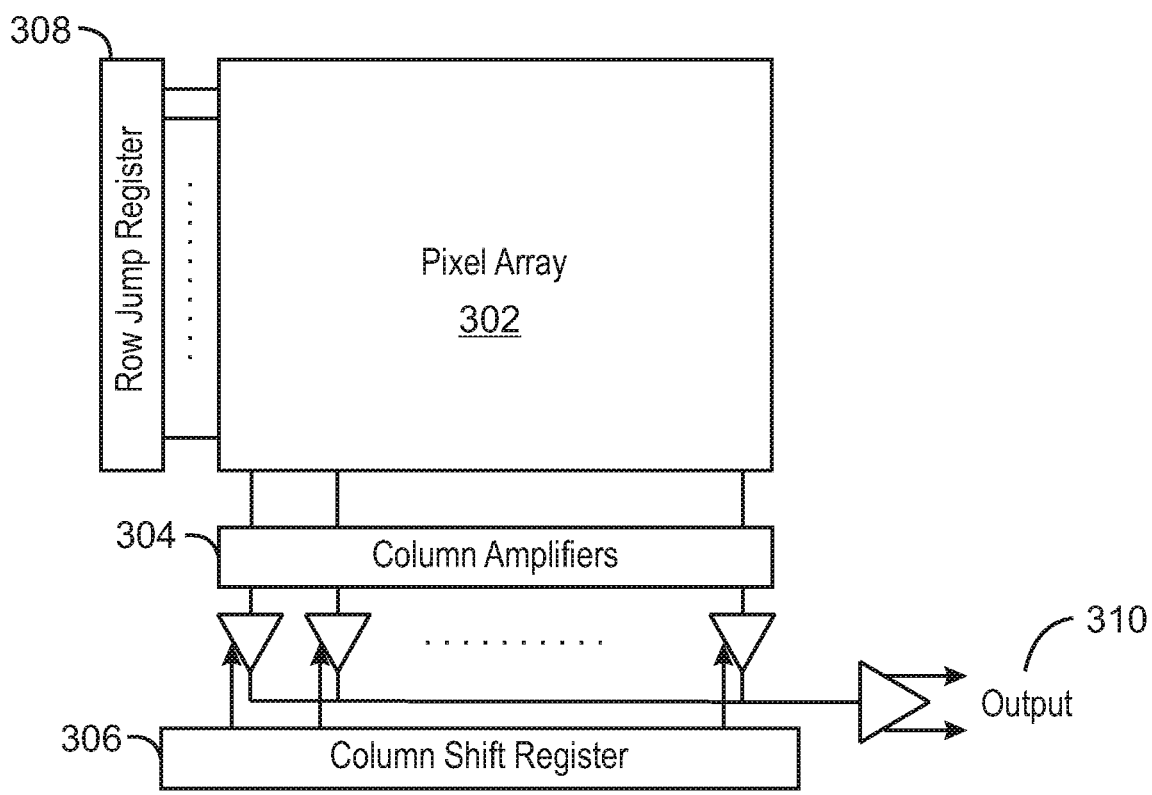
FIG. 3 is an example image sensor of the image capture device with shutter jumping.

FIG. 3 is an example image sensor 204 of the image capture device 202 with shutter jumping. The example image sensor 204 includes a light-sensitive pixel array 302, column amplifiers 304, column shift register 306, row jump register 308, and output 310.

The pixel array 302 receives the light of the scene, and provides data about the light, which can be processed to produce an image. The size of a pixel array is typically described in terms of the number of pixels in the horizontal (x) and vertical (y) directions, where a pixel represents one point of light in the image. In the example image sensor 204, the dimensions of the pixel array 302 are 320×240, which means 320 pixels horizontally, by 240 pixels vertically. However, the pixel array 302 in any embodiment may vary in size, both larger and smaller.

The column amplifiers 304 may amplify the signals provided by the pixel array 302. Amplifying these signals means increasing their amplitudes. As one row of data is read out at a time, one row of column amplifiers 304 is provided to amplify the signals for each row read out. This means there is one column amplifier 304 for each column in a row. In this example, the pixel sensor 204 includes three hundred and twenty (320) column amplifiers 304.

Reading out each row of the pixel array 302 specifically includes reading out each pixel in the read out row. Accordingly, the column shift register 306 shifts a selector-token across each column to enable the electrical signal from the pixel in the selected column of the read out row to flow through the column amplifiers 304, and to the output 310. The column shift register 306 may move the selector-token from left to right, or right to left, depending on the implementation.

The row jump register 308 selects individual rows of the pixel array 302 to be exposed and to be read out. The sequence of the rows read out is based on the jump distance. Exposure is when the pixels of the selected row are turned on to capture the light of the scene. To be read out means the electrical signals from all the pixels in the selected row are to be moved through the column amplifiers 304 and to the output 310. To collect one frame of an image, the row jump register 308 directs each row of the pixel array 302 to be exposed, and to be read out. However, the length of time of the exposure may vary based on lighting and other photographic considerations.

In some scenarios, the row jump register 308 may select multiple rows to perform different functions in parallel. For example, the row jump register 308 may select multiple rows to be exposed in parallel with selecting another row to be read out. In some embodiments, when the next row is selected for read out, the row jump register 308 may, in parallel, select the exposed rows to be exposed again, thus lengthening the time of exposure.

The example image sensor 204 is merely one possible implementation of an image sensor with shutter jumping. Additionally, example embodiments may be configured with different components and modules. Similar to the image sensor 204, example embodiments may record light data about an image using shutter jumping, and use the recorded light data to generate an image. However, different embodiments may use different components and processes than those described herein. For example, example image sensors may include components to adapt to light conditions, move data to memory using different mechanisms, and so on.

Figure 4A:
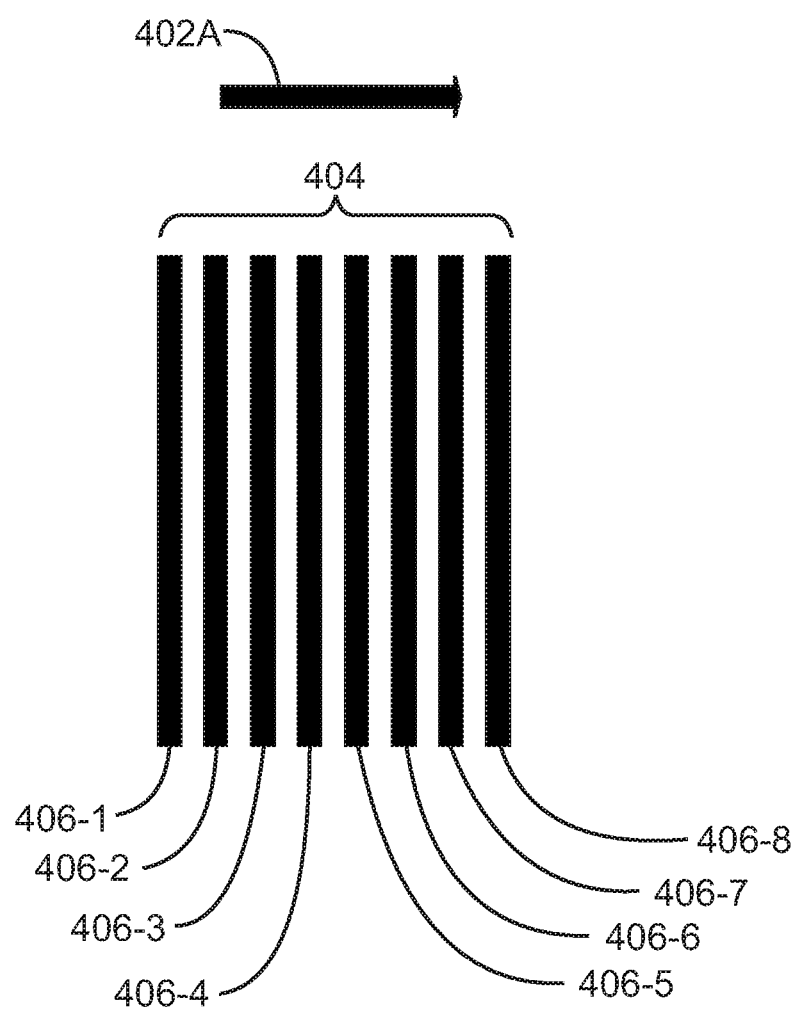
FIG. 4A is an example pixel array showing representations of an example object in motion.
Figure 4B:
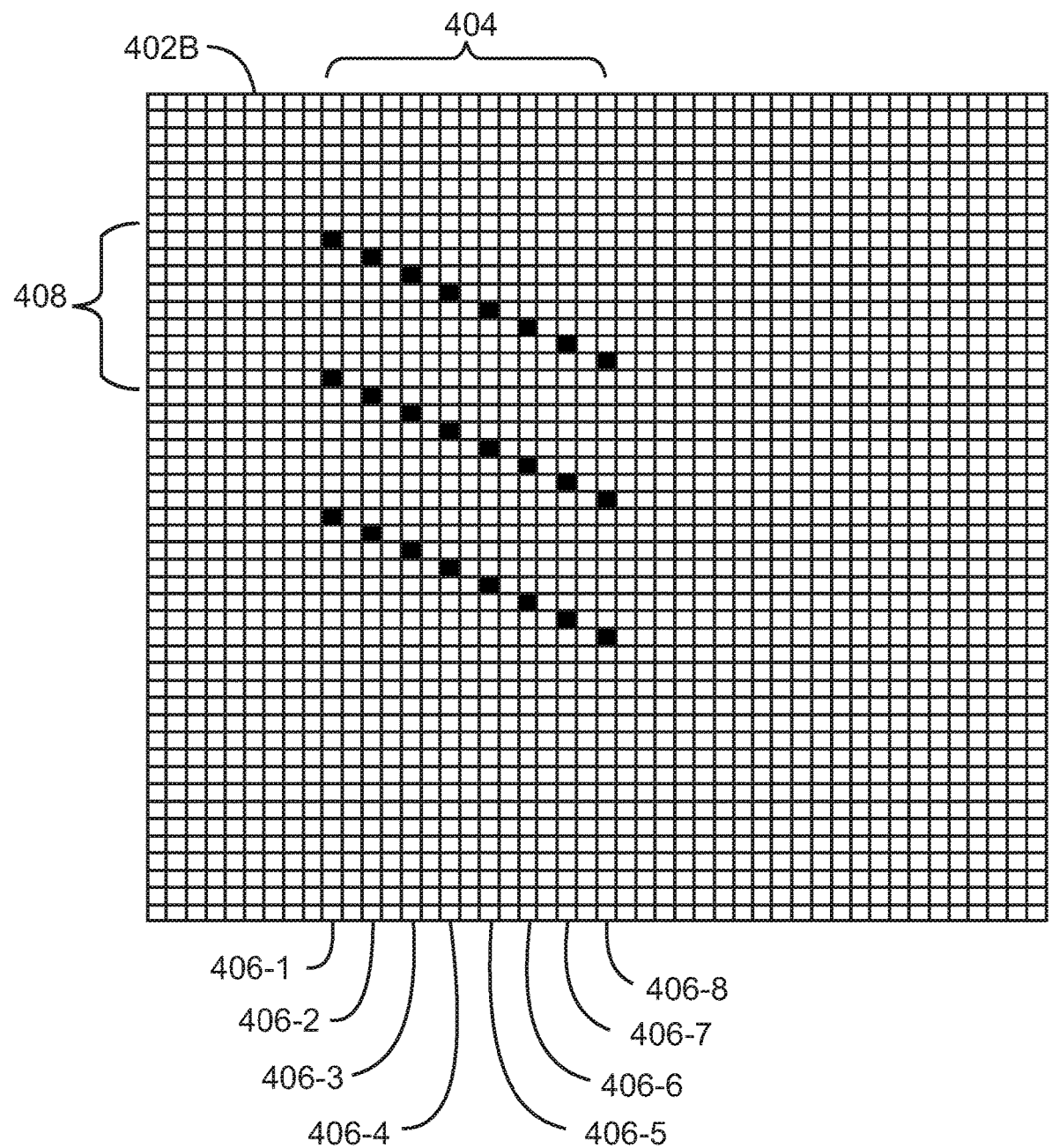
FIG. 4B is an example pixel array showing one frame of an image of the example object captured by an example image capture device with shutter jumping.

As stated previously, there may be times when the subject, or photographer, of an image may move while the image is being captured. Thus, to further demonstrate the operation of an image sensor with shutter jumping, the following discussion provides an example object whose image is captured as it is moving. In FIG. 4A, the example object is represented in motion during the time the image sensor 204 takes to capture one frame of a still or video image. In FIG. 4B, an image capture of the example object in motion is represented on an example pixel array.

FIG. 4A represents an example object 404 in motion during the time the image sensor 204 takes to capture one frame of an image of the example object 404. For the purpose of clarity, the example object 404 is an unremarkable vertical bar. An arrow 402A represents the direction that the example object 404 is moving, in this case, from left to right. More specifically, the example object 404 is shown moving from position 406-1 to position 406-2, to position 406-3, and so on. The following discussion describes an image capture of the example object 404 in motion with respect to position 406-1 through position 406-8.

FIG. 4B is an example pixel array 402B showing one frame of an image of the example object 404 captured by an example image capture device with shutter jumping. For the purpose of clarity, in this example, blur is ignored by binary quantization. Binary quantization limits the possible values for each pixel to either black or white. Thus, there are no pixels in the example pixel array 402B representing any blur that may be sensed by an image sensor with shutter jumping, such as the image sensor 204.

One frame of an image is captured by exposing and reading out all the rows of a pixel array, such as the example pixel array 402B. However, during the time it takes to expose and read out all the rows of the example pixel array 402B, the example object 404 moves from position 406-1 to position 406-8. Thus, the example pixel array 402B shows the part of the example object 404 that is exposed to the example pixel array 402B while the example object 404 is moving position-by-position from positions 406-1 through position 406-8. A jump distance 408 is shown for a jump performed while capturing this image. In this example, the jump distance 408 is a static eight.

The image sensor 204 may be capable of exposing and reading out six rows of pixels in the time it takes for the example object 404 to move from position 406-1 to position 406-2; from position 406-2 to position 406-3; etc., up through position 406-8. Because there are 48 rows, and the jump distance is eight, one pass of shutter jumps may be performed across the example pixel array 402B while the example object is located near each of the positions 406-1 thorough 406-8. In other words, rows 0, 8 . . . , 48 are exposed and read out while the example object 404 is moving from position 406-1 to position 406-2. Rows 1, 9 . . . 41 are exposed and read out during the time it takes for the example object 404 to move from position 406-2 to position 406-3, etc. Because the example object 404, as sensed, takes up only half of the example pixel array 402B, the example pixel array 402B shows only the parts of the example object 404 that may be sensed by the exposed rows. In this example, half, or three, of the pixel sensors capture image data at each position.

As stated previously, the information captured as shown in FIG. 4B does not appear like the example object 404 represented in FIG. 4A at each of positions 406-1 through 406-8. However, as stated previously, image capture devices typically perform post-processing on the image data to generate an image that more realistically represents the original image. Post-processing may include various video coding techniques, such as, up-sampling objects to a target resolution; correlating local areas of different objects individually by estimating local motion vectors; compensating for motion in objects; combining motion compensated objects into an output frame, i.e., the reconstructed image, and the like.

In embodiments, the example pixel array 402B may be partitioned into individual images, one image for each pass across the example pixel array 402B. The dimensions of the individual images are dependent upon the number of rows exposed for each pass across the example pixel array 402B. As there are 48 columns in a row, and six rows are exposed for each pass, a static jump distance of eight means the example pixel array 402B is partitioned into eight individual images, each with 48×6 pixel dimensions. In embodiments, the individual images may be modified and recombined to generate one image frame. In this example, the individual images of the image capture shown in example pixel array 402B show the example object 404 while at each position 406-1 through 406-8. Thus, the image data from all the exposed pixel sensors aligned with the example object 404 while located around position 406-1 is one image. The image data from all the pixel sensors aligned with the example object 404 while located around position 406-2 is another image, and so on.

As stated previously, the individual images may be modified, and then recombined to reconstruct the captured image. In some embodiments, the resolution of the individual images may be modified. This change in resolution may be based on the jump distance.

FIGS. 5A-5H are representations on a pixel array 502 of the individual images partitioned from the image captured by the example pixel array 402B. In these examples, the 48×48 resolution of the captured image is reduced by the jump distance. Because the jump distance is applied in shutter jumping in the y direction, reducing the resolution of the captured image in the y direction provides a lower-resolution image, but without losing any image data. No image data is lost because, in each image, there is no data captured between the jumped rows. Thus, the dimensions of example pixel arrays 502A through 502H have a resolution determined by reducing the dimensions of the example pixel array 402B by the jump distance of eight, i.e., 48×6.

Figure 5A:
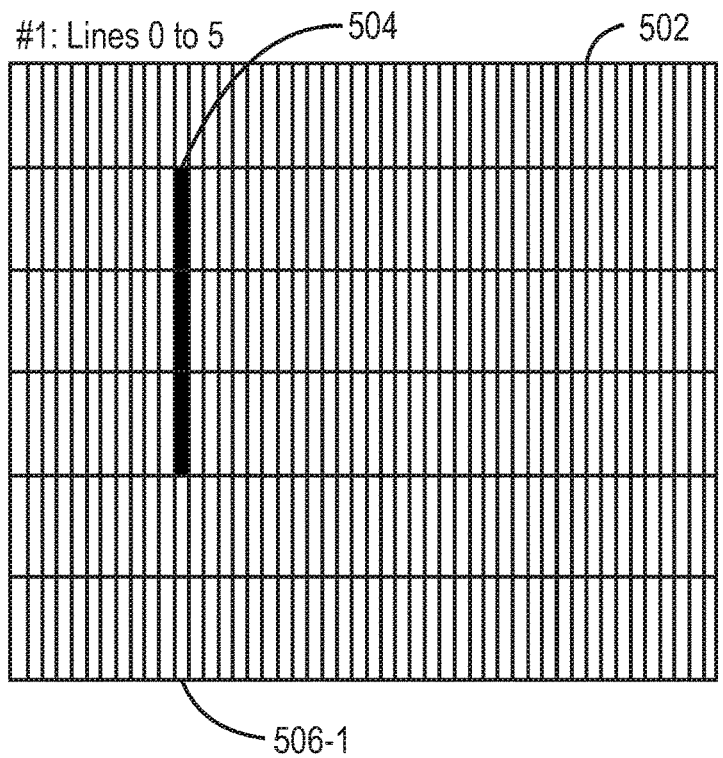
FIGS. 5A-5H are representations on a pixel array of the individual images partitioned from the image represented by the example pixel array.
Figure 5B:
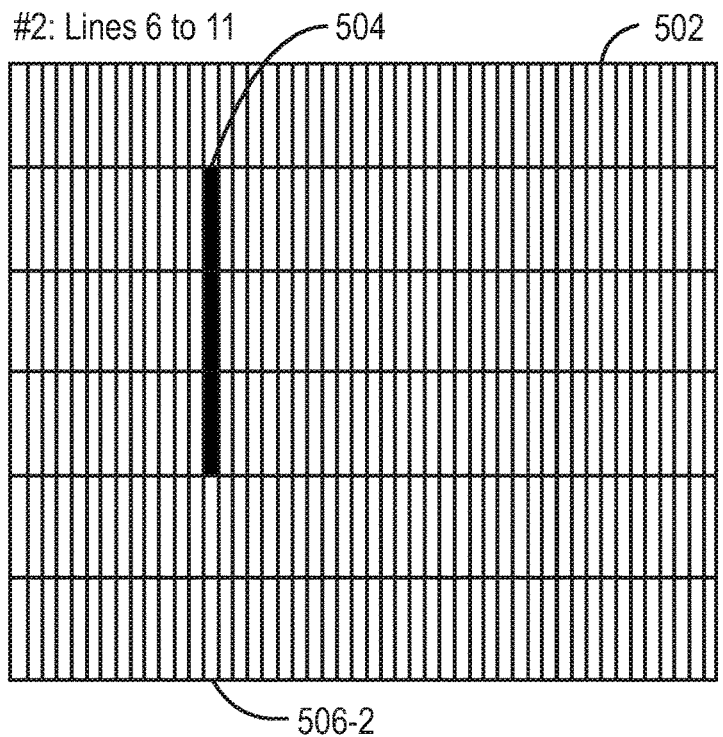
Figure 5C:
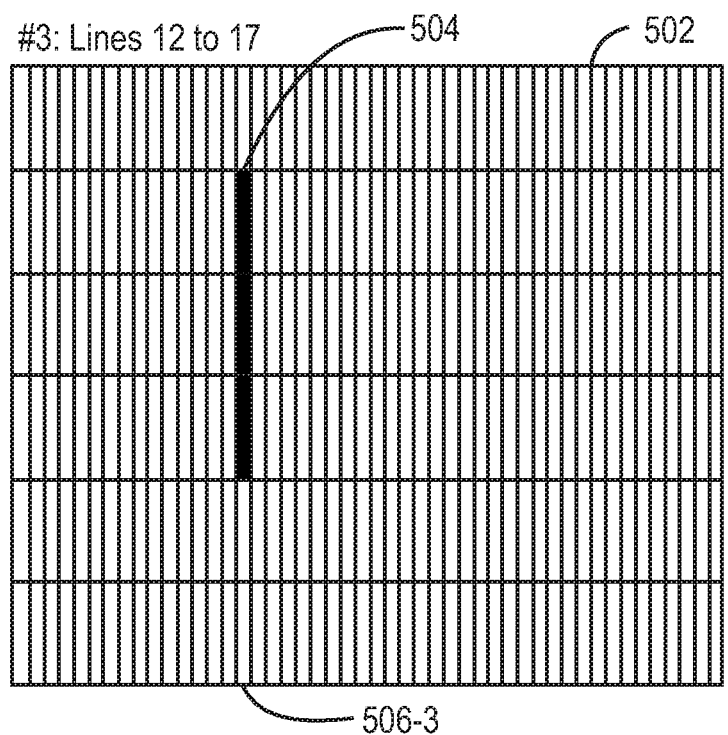
Figure 5D:
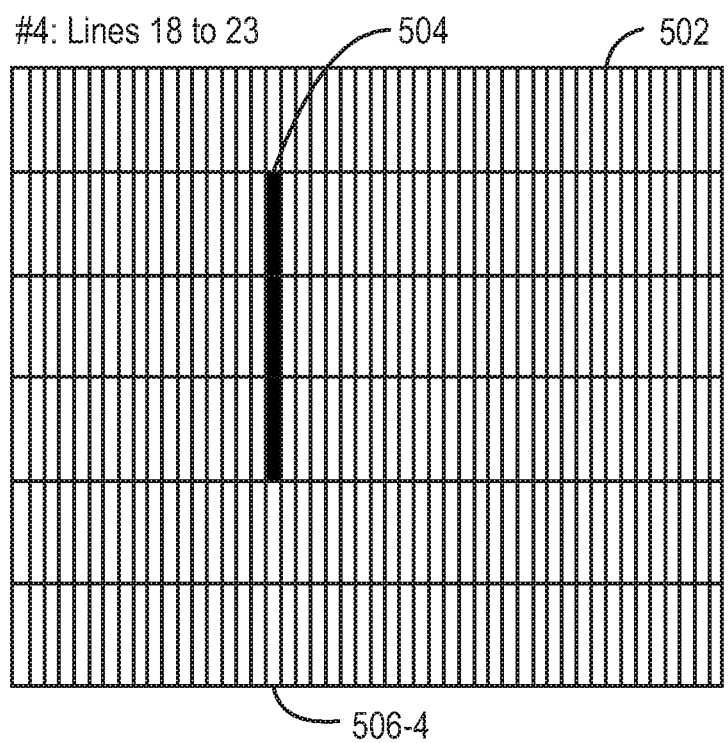
Figure 5E:
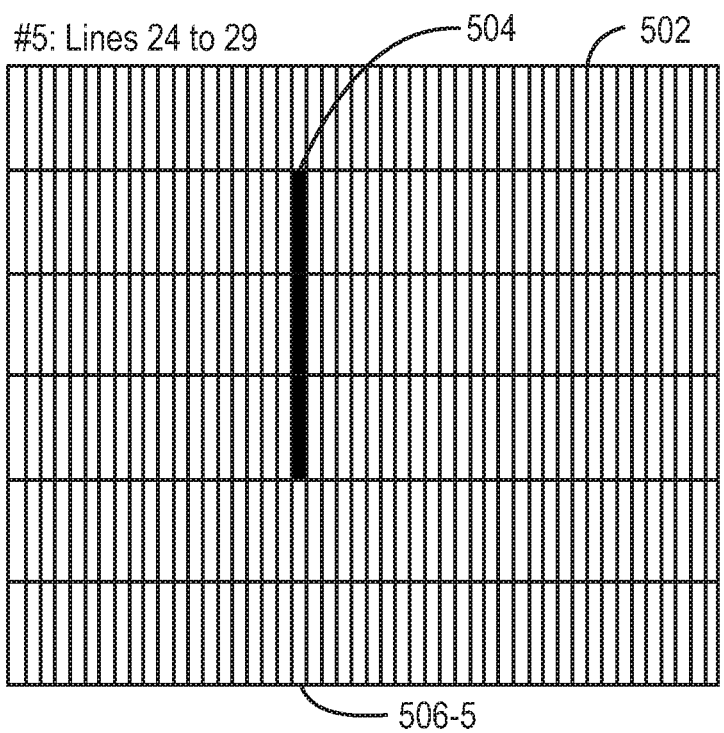
Figure 5F:
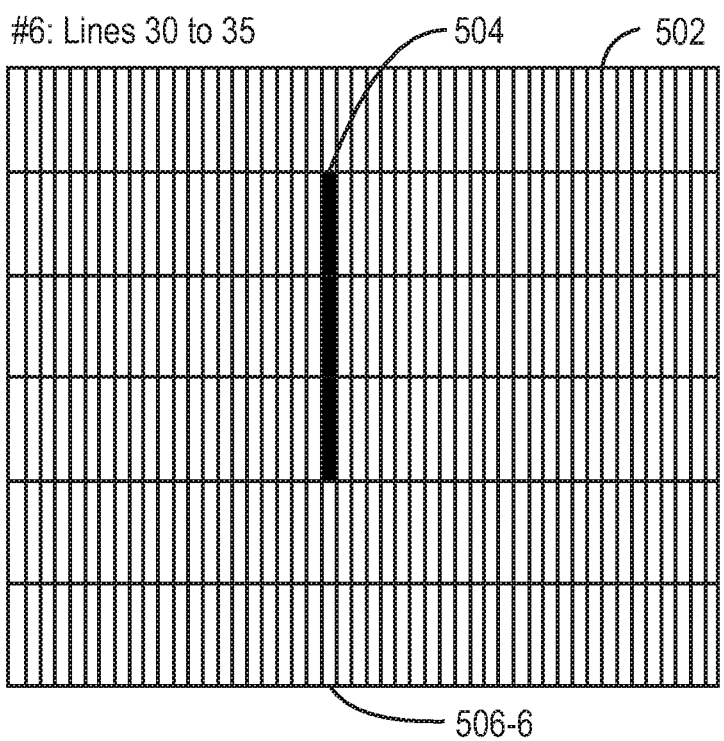
Figure 5G:
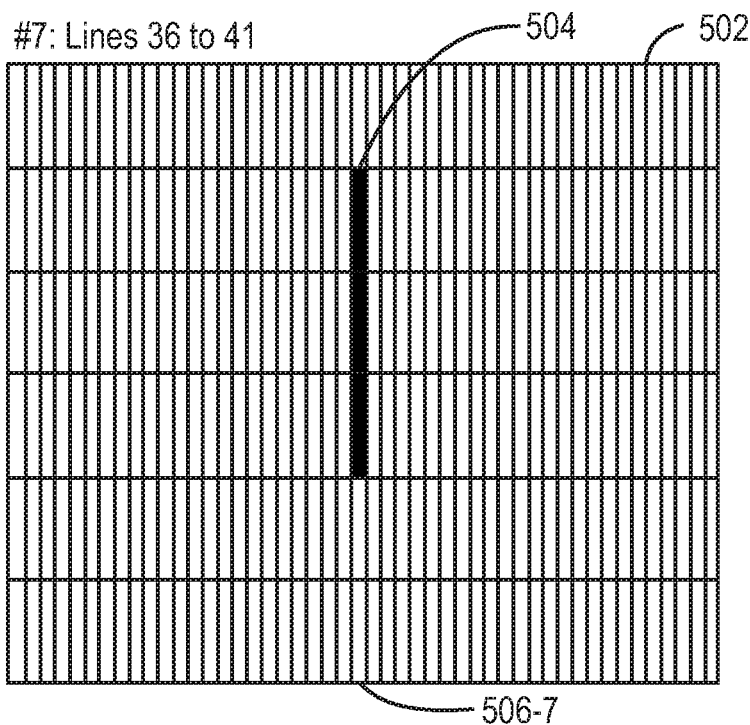
Figure 5H:
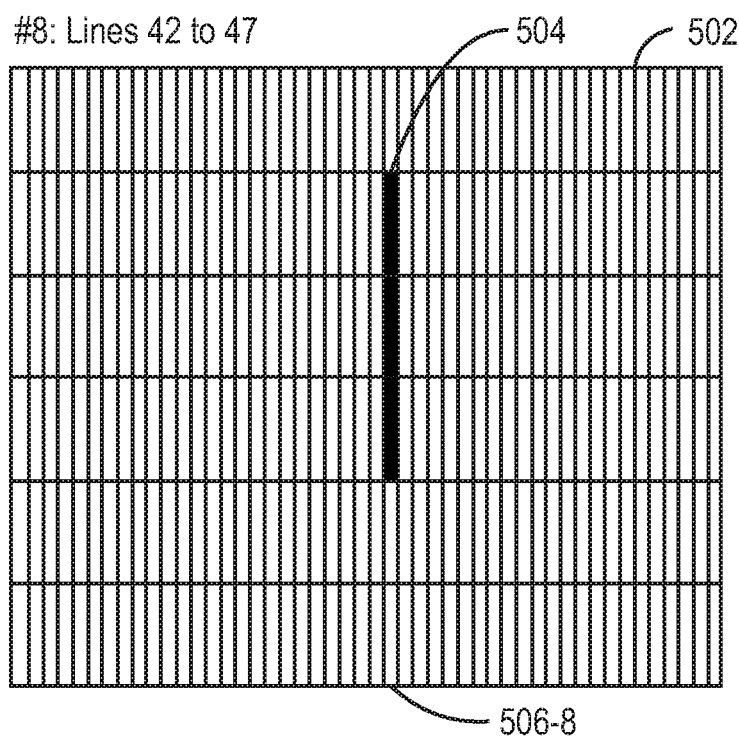

The pixel array 502 is six pixels in height to accommodate the reduced resolution images generated as described above. Further, for the purpose of clarity, the representations of example object 504 are stretched to maintain the appearance of the original aspect ratio. Each of FIGS. 5A-5H, represent the example object 504 at each of the positions 406-1 through 406-8, respectively. Further, each of the images represented in FIGS. 5A-5H represent successive rows of the reconstructed image in a vertical direction. For example, FIG. 5A represents pixel rows in the y direction of a pixel array from row zero to row five. FIG. 5B thus represents the next six rows, from row six to eleven; and so on, down to FIG. 5H, which represents rows 42 to 47.

Combining these low resolution images 5A-5H into a single image at the original 48×48 resolution is not trivial. However, this technique poses a similar problem as that in de-interlacing video streams for use with progressive displays. Interlacing is the sending of high resolution images over a network in a way that accounts for network latency. De-interlacing is thus processing interlaced video streams to reconstruct the original images. However, this de-interlacing issue has been resolved through the use of the progressive scan. A similar approach may be used for combining images, such as low resolution images 5A-5H into one higher resolution image.

Figure 6:
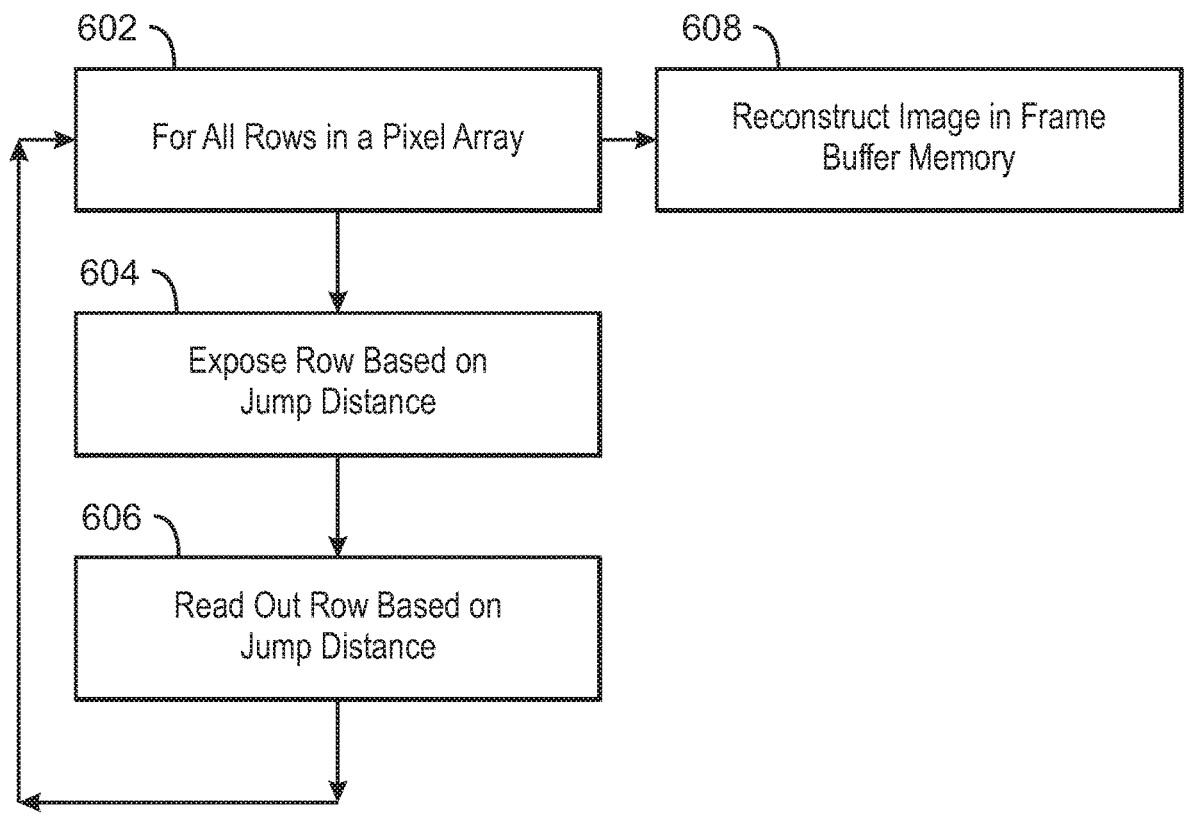
FIG. 6 is a method for image capture with shutter jumping.

FIG. 6 is a method 600 for image capture with shutter jumping. The method 600 may be performed by an image sensor, such as, for example, the image sensor 204; and, an image signal processor, such as, for example, the image signal processor 208. At block 602, an image sensor (for example, image sensor 204) performs blocks 604-606 for every row in the pixel array.

At block 604, the image sensor 204 may expose a row based on the jump distance. As stated previously, the jump distance definition may be fixed, such as in a hard-wired row jump register, or dynamic, such as in an image sensor where all the rows of the pixel array are muxed. Also stated previously, in some scenarios, multiple rows may be exposed in parallel with one that is read.

At block 606, the jump distance row may be read out. In other words, if multiple rows are exposed as described above, only one row is read out. Once read out, the image data for the row is moved to output, and ultimately into a frame buffer memory, such as the frame buffer memory 206.

Once all the rows are read, at block 608, the image signal processor (for example, image signal processor 208) reconstructs the image in the frame buffer memory 206. As stated previously, reconstructing the image includes partitioning the rows exposed in each pass across the pixel array into individual images. The individual images partitioned from the image capture are generated at a relatively lower resolution than the original image. The relatively lower resolution images are later combined to generate the image at the original resolution. Additionally, post-processing may be performed on the image data using standard video coding techniques.

Herein, embodiments have been described with reference to a shutter jumping in one dimension, e.g., the y-direction. However, in some embodiments, the shutter jumping means jumping in two dimensions, i.e., the x- and y-directions.

Figure 7:
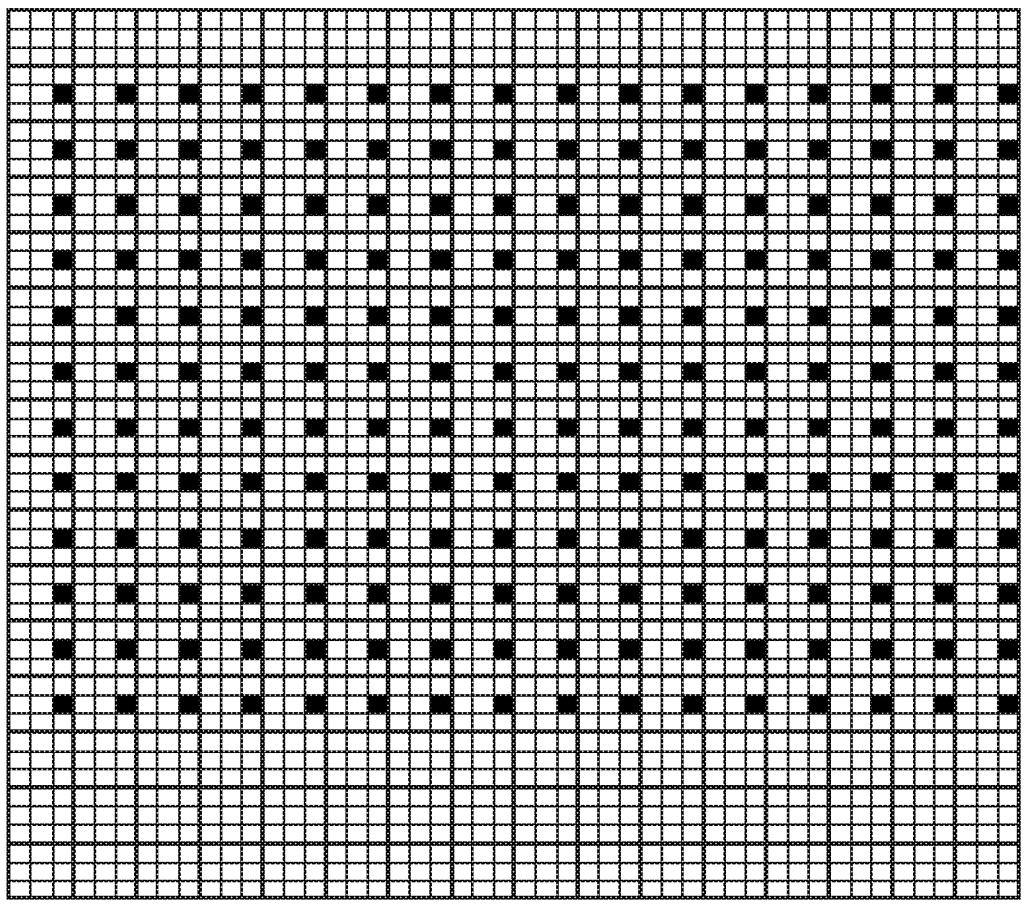
FIG. 7 is an example of exposed pixels for one frame of an image capture with two-dimensional shutter jumping.

FIG. 7 is an example of exposed pixels for one frame of an image capture with two-dimensional shutter jumping. With two-dimensional shutter jumping, instead of rows, individual pixels are exposed and read out, and are positioned within a specific jump distance in the x-direction, and jump distance in the y-direction from each other. Thus, at one time, pixel array 702 may have a pixel exposed and read out at every location that is colored in. In embodiments of two-dimensional shutter jumping, the image sensor, such as, for example, image sensor 204, is redesigned to allow for individual pixel selection based on the x- and y-direction jump distances.

In such an embodiment, instead of constructing a low resolution image for each pass across the pixel array, a low resolution image is constructed from multiple pixel captures, similar to that shown in pixel array 702. In this example, an image capture device, such as image capture device 202, for example, may construct nine 16×16 low resolution images, without losing any information. The nine low resolution images may be upscaled to 48×48, and then combined using post-processing techniques, as described above.

Figure 8:
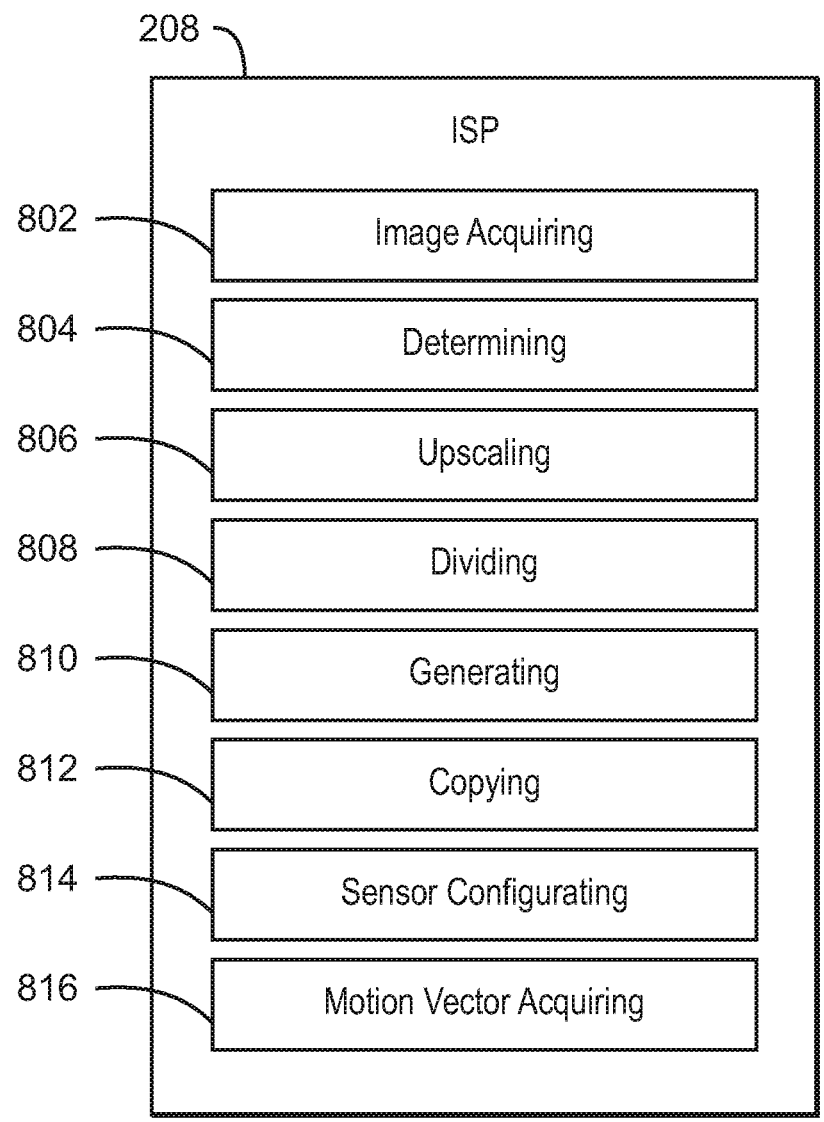
FIG. 8 is an example ISP for image capture with shutter jumping.

FIG. 8 is an example ISP 208 for image capture with shutter jumping. The ISP 208 includes some built-in modules for processes that are commonly performed in image processing. Having these built-in modules significantly reduces the time within which the images are processed. The ISP 208 includes modules for image acquiring 802, determining 804, upscaling 806, dividing 808, generating 810, copying 812, sensor configuration 814, and motion vector acquiring 816.

Acquiring 802 operates the image sensor 204, and is responsible for placing the image data in the frame buffer memory 206. Determining 804 determines the boundaries of the image. The boundaries may be prescribed by the size of the image sensor, and is usually described in horizontal and vertical dimensions. For example, a 480×320 boundary represents an image that is 480 pixels in the horizontal by 320 in the vertical.

Upscaling 806 involves changing the size of an image. Typically, upscaling refers to making images larger. Dividing 808 may partition the image according to various criteria, such as differing color palettes in different areas of the image. Dividing 808 is generally concerned with finding different objects in an image, and grouping each of these objects into its own partition. Generating 810 involves the generation of the reconstructed image. Generating 810 coordinates the operation of the other modules in the ISP 208. Copying 812 is used when quickly made copies can be useful in an image processing algorithm. The sensor configuration 814 configures the operating defaults of the sensors, such as their sensitivity to light.

Motion vector acquiring 816 generates a representative motion vector for pixels, or continuous groups of pixel in the image. Motion vector acquiring 816 is used to attempt to identify moving objects in an image. If an area of the image includes a contiguous group of pixels all moving in the same direction, this may indicate these pixels represent an individual object in the image. Because motion vectors are a way to represent the direction of an object, knowing the motion vectors of pixels, or groups of pixels may be useful in reconstructing the image.

Figure 9:
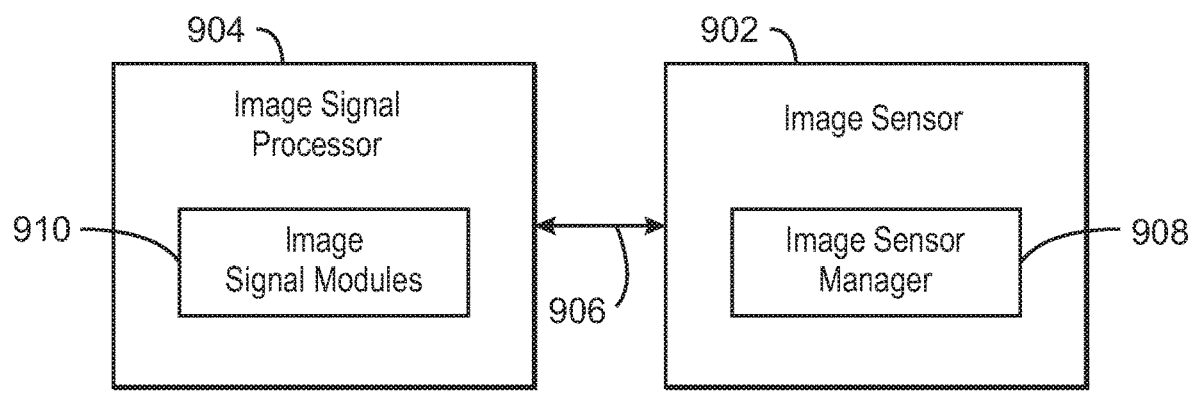
FIG. 9 is an image capture device with shutter jumping.

FIG. 9 is an image capture device 900 with shutter jumping. The image capture device 900 includes an image sensor 902 and an image signal processor 904. The image sensor 902 may be an image sensor, such as image sensor 204. The image signal processor 904 may be an image signal processor, such as image signal processor 208. The image sensor 902 is in communication with the image signal processor 904 over a bus 906.

The image sensor 902 includes computer readable storage media, such as an image sensor manager 908. The image sensor manager 908 may perform the techniques described herein with respect to an image sensor, such as the image sensor 204. Additionally, the image sensor 902 includes computer readable storage media, such as the image signal modules 910. The image signal modules 910 may perform the techniques described herein with respect to an image signal processor, such as image signal processor 208.

For example, the image sensor manager 908 may expose and read the rows of a pixel array in a non-sequential, patterned order that is based on the jump distance. The image sensor manager 908 may also provide the image data in a frame buffer memory, such as frame buffer memory 206. The image signal modules 910 may perform reconstruction of the image using the image data stored in the frame buffer memory 206.

FIG. 9 is not intended to indicate that the image capture device 900 is to include all of the components shown in FIG. 9. Further, the image capture device 900 may include any number of additional components not shown in FIG. 9, depending on the details of the specific implementation.

Figure 10:
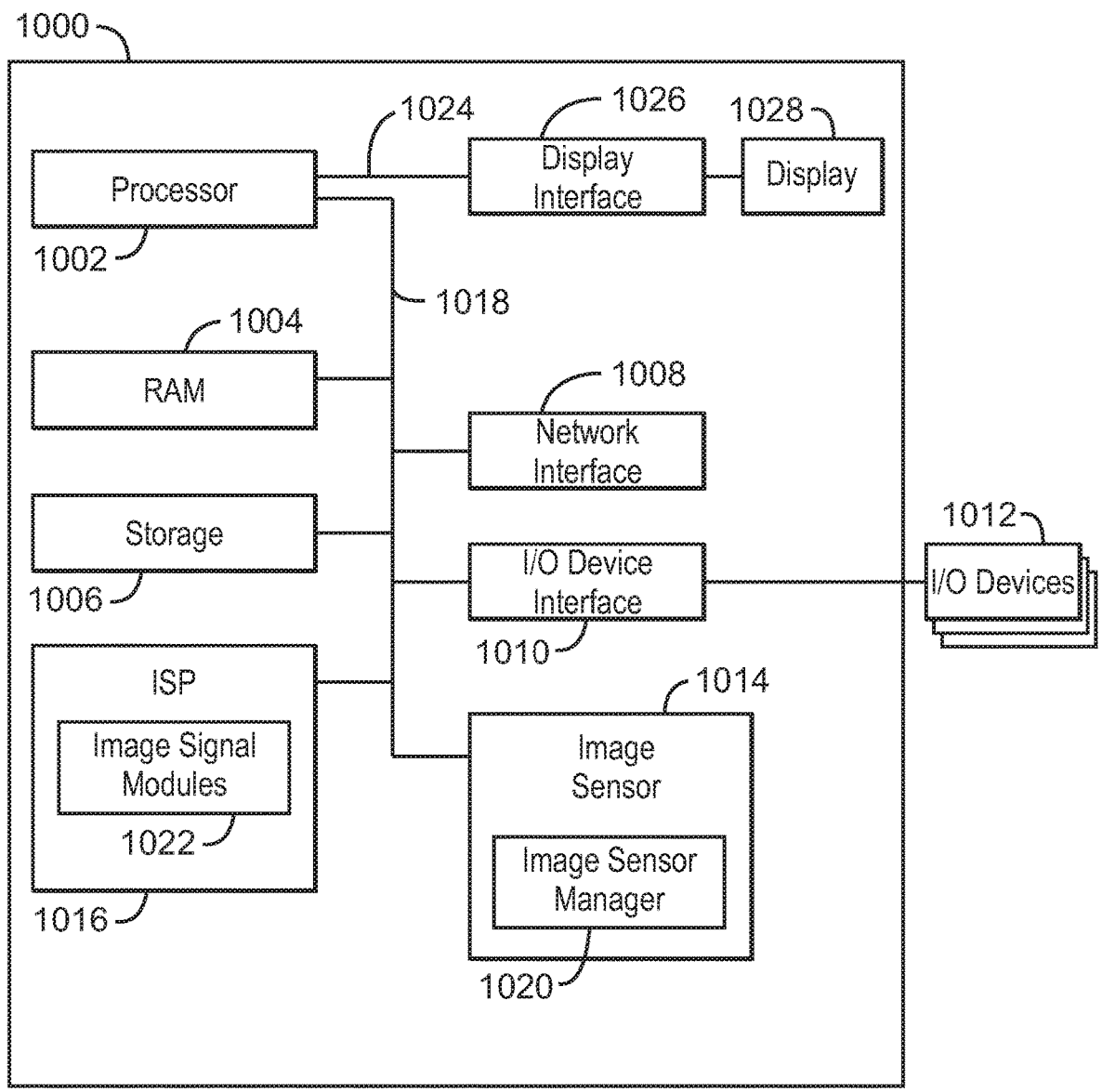
FIG. 10 is an example device for shutter jumping.

FIG. 10 is an example device 1000 (for example, a computing device) for shutter jumping. The example device 1000 includes a processor 1002 such as, for example, a central processing unit (CPU), random access memory (RAM) 1004, storage 1006, a network interface 1008, an input-output (I/O) device interface 1010, an image sensor 1014, and an image signal processor (ISP) 1014 in communication via a bus 1018. The device 1000 may be, for example, a mobile phone, laptop, tablet, phablet, wearable device, and the like. The device 1000 may include a processor 1002 that is adapted to execute stored instructions, as well as a RAM 1004 that stores instructions that are executable by the processor 1002. The processor 1002 can be a single core processor, a multi-core processor, a computing cluster, or any number of other configurations. The RAM 1004 can be one or more of random access memory, flash memory, or any other suitable type of memory and/or memory system.

The storage 1006 may be used for longer-term storage than the RAM 1004. The storage 1006 may include a hard drive, an optical drive, a USB flash drive, an array of drives, or any combinations thereof.

In addition, a network interface 1008 may be adapted to connect the device 1000 through the bus 1018 to a network (not shown). The network may be a cellular network, a radio network, a wide area network (WAN), a local area network (LAN), or the Internet, among others, or a combination thereof.

The I/O device interface 1010 may connect the computing host device 1000 to one or more I/O devices 1012. The I/O devices 1012 may include, for example, a touchscreen, a keyboard, or a pointing device. The I/O devices 1012 may be built-in components of the device 1000, or may be devices that are externally connected to the device 1000.

The image sensor 1014 may include an image sensor manager 1020. The image sensor manager 1020 may operate the image sensor 1014 in accordance with the techniques described herein. Additionally, the ISP 1016 may include the image signal modules 1022. The image signal modules 1022 may operate the ISP 1016 in accordance with the techniques described herein.

The processor 1002 may also be linked through a bus 1024 (e.g., PCI®, PCI-Express®, NuBus, etc.) to a display interface 1026 adapted to connect to a display 1028. In one embodiment, the example device 1000 includes a system on a chip (SoC) with a processor 1002 and a graphics processing unit. In such an embodiment, the SoC may have a dedicated display interface to the display 1028. The display 1028 can include an of various electronic displays, such as displays with organic light emitting diodes (OLEDs), liquid crystal displays (LCD) and/or micro-LEDs, among others. Additionally, the display interface 1026 may provide a connection to other display devices, such as a computer monitor, television, or projector, among others. The display interface 1026 can include any suitable graphics processing unit, transmitter, port, physical interconnect, and the like. Further, the display interface 1026 can implement any suitable protocol for transmitting data to the display 208, or any other suitable sink device.

The block diagram of FIG. 10 is not intended to indicate that the device 1000 is to include all of the components shown in FIG. 10. Rather, the device 1000 can include fewer or additional components not illustrated in FIG. 10 (e.g., additional memory components, embedded controllers, additional modules, additional network interfaces, etc.). Furthermore, any of the functionalities of the device 1000 may be partially, or entirely, implemented in hardware and/or in the processor 1002. For example, the functionality may be implemented with an application specific integrated circuit, logic implemented in an embedded controller, logic implemented in the processor 1002, software (e.g., an application, among others), firmware, or any suitable combination of hardware, software, and firmware.

Reference in the specification to "an example", "some examples", "one embodiment", "some embodiments", "an embodiment", etc. of the disclosed subject matter means that a particular feature, structure, or characteristic described in connection with the embodiment or example is included in at least one embodiment or example of the disclosed subject matter. Thus, the phrase "in one embodiment" or "one example" may appear in various places throughout the specification, but the phrase may not necessarily refer to the same embodiment.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, graphics processing units, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

EXAMPLES

Example 1 includes an apparatus for capturing an image includes a pixel array, and a row jump register to expose a plurality of rows of the pixel array to the image, wherein the rows are exposed in a non-sequential, patterned order based on a jump distance, and read the rows of the pixel array into a frame buffer memory, wherein the rows are read from in the non-sequential, patterned order based on the jump distance.

Example 2 includes the apparatus of example 1, including a processor to generate a reconstructed image by post-processing data about the image from the read rows in the frame buffer memory.

Example 3 includes the apparatus of example 2, wherein the image is reconstructed by generating a plurality of low resolution images from the read rows, one for each pass across the pixel array performed using the jump distance.

Example 4 includes the apparatus of example 3, wherein the image is reconstructed by generating a plurality of original resolution images from the low resolution images, wherein an original resolution includes a resolution of the pixel array.

Example 5 includes the apparatus of example 1, wherein the jump distance is based on whether a subject of the image is moving.

Example 6 includes the apparatus of example 1, wherein the jump distance is based on whether the apparatus is moving.

Example 7 includes the apparatus of example 1, wherein the jump distance is a predetermined integer value not equal to zero.

Example 8 includes the apparatus of example 1, wherein a value of the jump distance is varied.

Example 9 includes the apparatus of example 7, including a plurality of multiplexors connecting the row jump register with each of the rows.

Example 10 includes one or more tangible, non-transitory computer readable media to implement image capture, including a plurality of instructions that, in response to being executed on an image sensor, cause the image sensor to expose a plurality of rows of a pixel array to the image, wherein the rows are exposed in a non-sequential, patterned order based on a jump distance, and read the rows of the pixel array into a frame buffer memory, wherein the rows are read from in the non-sequential, patterned order based on the jump distance.

Example 11 includes the one or more tangible, non-transitory computer readable media of example 10. In some examples, the instructions, in response to being executed on a processor cause the processor to generate a reconstructed image by post-processing data about the image in the frame buffer memory.

Example 12 includes the one or more tangible, non-transitory computer readable media of example 11. In some examples, the image is reconstructed by generating a plurality of low resolution images from the read rows, one for each pass across the pixel array performed using the jump distance.

Example 13 includes the one or more tangible, non-transitory computer readable media of example 12. In some examples, the image is reconstructed by generating a plurality of original resolution images from the low resolution images, wherein an original resolution includes a resolution of the pixel array.

Example 14 includes the one or more tangible, non-transitory computer readable media of example 10. In some examples, the jump distance is based on whether a subject of the image is moving.

Example 15 includes the one or more tangible, non-transitory computer readable media of example 10. In some examples, the jump distance is based on whether the image sensor is moving.

Example 16 includes the one or more tangible, non-transitory computer readable media of example 10. In some examples, the jump distance is a predetermined integer value not equal to zero.

Example 17 includes the one or more tangible, non-transitory computer readable media of example 10. In some examples, the jump distance is varied.

Example 18 includes a method of capturing an image, the method including exposing a plurality of rows of a pixel array to the image, wherein the rows are exposed in a non-sequential, patterned order based on a jump distance, and read the rows of the pixel array into a frame buffer memory, wherein the rows are read from in the non-sequential, patterned order based on the jump distance.

Example 19 includes the method of example 18, including generating a reconstructed image by post-processing data about the image in the frame buffer memory.

Example 20 includes the method of example 19. In some examples, the image is reconstructed by generating a plurality of low resolution images from the read rows, one for each pass across the pixel array performed using the jump distance.

Example 21 includes the method of example 20. In some examples, the image is reconstructed by generating a plurality of original resolution images from the low resolution images, wherein an original resolution includes a resolution of the pixel array.

Example 22 includes the method of example 18. In some examples, the jump distance is based on whether a subject of the image is moving with respect to the pixel array.

Example 23 includes the method of example 18. In some examples, the jump distance is based on whether the pixel array is moving with respect to the image.

Example 24 includes the method of example 18. In some examples, the jump distance is a predetermined integer value not equal to zero.

Example 25 includes the method of example 18. In some examples, a value of the jump distance is varied.

Example 26 includes the method of example 25. In some examples, the jump distance is implemented using a plurality of multiplexors connecting a row jump register with each of the rows.

Example 27 includes an apparatus for capturing an image includes a memory including executable instructions, and a processor to execute the executable instructions to expose a plurality of pixel sensors of a pixel array to the image, wherein the pixel sensors include a column of jumped rows and a row of jumped columns, based on an x-directed jump distance and a y-directed jump distance, and read the pixel sensors into a frame buffer memory, wherein the row is read from in an order based on the x-directed jump distance. Additionally, the column is read from in an order based on the y-directed jump distance.

Example 28 includes the apparatus of example 27, including a processor to generate a reconstructed image by post-processing data about the image in the frame buffer memory.

Example 29 includes the apparatus of example 28. In some examples, the image is reconstructed by generating a plurality of low resolution images from the read rows, one for each pass across the pixel array performed using the jump distance.

Example 30 includes the apparatus of example 29. In some examples, the image is reconstructed by generating a plurality of original resolution images from the low resolution images, wherein an original resolution includes a resolution of the pixel array.

Example 31 includes the apparatus of example 27. In some examples, the jump distance is based on whether a subject of the image is moving.

Example 32 includes the apparatus of example 27. In some examples, the jump distance is based on whether the apparatus is moving.

Example 33 includes the apparatus of example 27. In some examples, the jump distance is a predetermined integer value not equal to zero.

Example 34 includes the apparatus of example 27. In some examples, a value of the jump distance is varied.

Example 35 includes the apparatus of example 29 includes a plurality of multiplexors connecting the row jump register with each of the rows, and a plurality of multiplexors connecting a column jump register with each of the rows.

Example 36 includes an apparatus for capturing an image includes a pixel array, and a row jump register to expose a plurality of rows of the pixel array to the image. In some examples, the rows are exposed in a non-sequential, patterned order based on a jump distance, and read the rows of the pixel array into a frame buffer memory, wherein the rows are read from in the non-sequential, patterned order based on the jump distance.

Example 37 includes the apparatus of example 36, including a processor to generate a reconstructed image by post-processing data about the image from the read rows in the frame buffer memory.

Example 38 includes the apparatus of example 37. In some examples, the image is reconstructed by generating a plurality of low resolution images from the read rows, one for each pass across the pixel array performed using the jump distance.

Example 39 includes the apparatus of example 38. In some examples, the image is reconstructed by generating a plurality of original resolution images from the low resolution images, wherein an original resolution includes a resolution of the pixel array.

Example 40 includes the apparatus of examples 36 or 37, wherein the jump distance is based on whether a subject of the image is moving.

Example 41 includes the apparatus of examples 36 or 37, wherein the jump distance is based on whether the apparatus is moving.

Example 42 includes the apparatus of examples 36 or 37, wherein the jump distance is a predetermined integer value not equal to zero.

Example 43 includes the apparatus of examples 36 or 37, wherein a value of the jump distance is varied.

Example 44 includes the apparatus of example 36, 37, or 42, including a plurality of multiplexors connecting the row jump register with each of the rows.

Example 45 includes one or more tangible, non-transitory computer readable media to implement image capture, including a plurality of instructions that, in response to being executed on an image sensor, cause the image sensor to expose a plurality of rows of a pixel array to the image. In some examples, the rows are exposed in a non-sequential, patterned order based on a jump distance, and read the rows of the pixel array into a frame buffer memory, wherein the rows are read from in the non-sequential, patterned order based on the jump distance.

Example 46 includes the one or more tangible, non-transitory computer readable media of example 45. In some examples, the instructions, in response to being executed on a processor cause the processor to generate a reconstructed image by post-processing data about the image in the frame buffer memory.

Example 47 includes the one or more tangible, non-transitory computer readable media of example 46. In some examples, the image is reconstructed by generating a plurality of low resolution images from the read rows, one for each pass across the pixel array performed using the jump distance.

Example 48 includes the one or more tangible, non-transitory computer readable media of example 47. In some examples, the image is reconstructed by generating a plurality of original resolution images from the low resolution images, wherein an original resolution includes a resolution of the pixel array.

Example 49 includes the one or more tangible, non-transitory computer readable media of examples 45 or 46, wherein the jump distance is based on whether a subject of the image is moving.

Example 50 includes the one or more tangible, non-transitory computer readable media of examples 45 or 46, wherein the jump distance is based on whether the image sensor is moving.

Example 51 includes the one or more tangible, non-transitory computer readable media of examples 45 or 46, wherein the jump distance is a predetermined integer value not equal to zero.

Example 52 includes the one or more tangible, non-transitory computer readable media of examples 45 or 46, wherein the jump distance is varied.

Example 53 includes an apparatus for capturing an image, the apparatus including means to expose a plurality of rows of a pixel array to the image, wherein the rows are exposed in a non-sequential, patterned order based on a jump distance, and means to read the rows of the pixel array into a frame buffer memory, wherein the rows are read from in the non-sequential, patterned order based on the jump distance.

Example 54 includes the apparatus of example 53, including means to generate a reconstructed image by post-processing data about the image in the frame buffer memory.

Example 55 includes the apparatus of example 54. In some examples, the image is reconstructed by means to generate a plurality of low resolution images from the read rows, one for each pass across the pixel array performed using the jump distance.

Example 56 includes the apparatus of example 55. In some examples, the image is reconstructed by means to generate a plurality of original resolution images from the low resolution images, wherein an original resolution includes a resolution of the pixel array.

Example 57 includes the apparatus of examples 53 or 54, wherein the jump distance is based on whether a subject of the image is moving with respect to the pixel array.

Example 58 includes the apparatus of examples 53 or 54, wherein the jump distance is based on whether the pixel array is moving with respect to the image.

Example 59 includes the apparatus of examples 53 or 54, wherein the jump distance is a predetermined integer value not equal to zero.

Example 60 includes the apparatus of examples 53 or 54, wherein a value of the jump distance is varied.

Example 61 includes an apparatus for capturing an image includes a pixel array, and a row jump register to expose a plurality of rows of the pixel array to the image, wherein the rows are exposed in a non-sequential, patterned order based on a jump distance, and read the rows of the pixel array into a frame buffer memory, wherein the rows are read from in the non-sequential, patterned order based on the jump distance.

Example 62 includes the apparatus of example 61, including a processor to generate a reconstructed image by post-processing data about the image from the read rows in the frame buffer memory.

Example 63 includes the apparatus of example 62. In some examples, the image is reconstructed by generating a plurality of low resolution images from the read rows, one for each pass across the pixel array performed using the jump distance.

Example 64 includes the apparatus of example 63. In some examples, the image is reconstructed by generating a plurality of original resolution images from the low resolution images, wherein an original resolution includes a resolution of the pixel array.

Example 65 includes the apparatus of examples 61 or 62, wherein the jump distance is based on whether a subject of the image is moving.

Example 66 includes the apparatus of examples 61 or 62, wherein the jump distance is based on whether the apparatus is moving.

Example 67 includes the apparatus of examples 61 or 62, wherein the jump distance is a predetermined integer value not equal to zero.

Example 68 includes the apparatus of examples 61 or 62, wherein a value of the jump distance is varied.

Example 69 includes the apparatus of example 67, including a plurality of multiplexors connecting the row jump register with each of the rows.

Example 70 includes an image capture device includes a pixel array, a row jump register, a processor, and a memory including instructions that cause the processor to expose a plurality of rows of a pixel array to the image. In some examples, the rows are exposed in a non-sequential, patterned order based on a jump distance, and read the rows of the pixel array into a frame buffer memory, wherein the rows are read from in the non-sequential, patterned order based on the jump distance.

Example 71 includes the image capture device of example 70. In some examples, the instructions cause the processor to generate a reconstructed image by post-processing data about the image in the frame buffer memory.

Example 72 includes the image capture device of example 71. In some examples, the image is reconstructed by generating a plurality of low resolution images from the read rows, one for each pass across the pixel array performed using the jump distance.

Example 73 includes the image capture device of example 72. In some examples, the image is reconstructed by generating a plurality of original resolution images from the low resolution images, wherein an original resolution includes a resolution of the pixel array.

Example 74 includes the image capture device of examples 70 or 71, wherein the jump distance is based on whether a subject of the image is moving.

Example 75 includes the image capture device of examples 70 or 71, wherein the jump distance is based on whether the image sensor is moving.

Example 76 includes the image capture device of examples 70 or 71, wherein the jump distance is a predetermined integer value not equal to zero.

Example 77 includes the image capture device of examples 70 or 71, wherein the jump distance is varied.

Example 78 includes an method of capturing an image, the method including exposing a plurality of rows of a pixel array to the image, wherein the rows are exposed in a non-sequential, patterned order based on a jump distance, and read the rows of the pixel array into a frame buffer memory, wherein the rows are read from in the non-sequential, patterned order based on the jump distance.

Example 79 includes the method of example 78, including generating a reconstructed image by post-processing data about the image in the frame buffer memory.

Example 80 includes the method of example 79. In some examples, the image is reconstructed by generating a plurality of low resolution images from the read rows, one for each pass across the pixel array performed using the jump distance.

Example 81 includes the method of example 80. In some examples, the image is reconstructed by generating a plurality of original resolution images from the low resolution images, wherein an original resolution includes a resolution of the pixel array.

Example 82 includes the method of examples 78 or 79, wherein the jump distance is based on whether a subject of the image is moving with respect to the pixel array.

Example 83 includes the method of examples 78 or 79, wherein the jump distance is based on whether the pixel array is moving with respect to the image.

Example 84 includes the method of examples 78 or 79, wherein the jump distance is a predetermined integer value not equal to zero.

Example 85 includes the method of examples 78 or 79, wherein a value of the jump distance is varied.

Example 86 includes an apparatus for capturing an image includes a pixel array (302), and a row jump register (308) to expose a plurality of rows of the pixel array (302) to the image, wherein the rows are exposed in a non-sequential, patterned order based on a jump distance, and read the rows of the pixel array (308) into a frame buffer memory (206), wherein the rows are read from in the non-sequential, pattered order based on the jump distance.

Example 87 includes the apparatus of example 86, including a processor to generate a reconstructed image by post-processing data about the image from the read rows in the frame buffer memory.

Example 88 includes the apparatus of example 87. In some examples, the image is reconstructed by generating a plurality of low resolution images from the read rows, one for each pass across the pixel array performed using the jump distance.

Example 89 includes the apparatus of example 88. In some examples, the image is reconstructed by generating a plurality of original resolution images from the low resolution images, wherein an original resolution includes a resolution of the pixel array.

Example 90 includes the apparatus of examples 86 or 87, wherein the jump distance is based on whether a subject of the image is moving.

Example 91 includes the apparatus of examples 86 or 87, wherein the jump distance is based on whether the apparatus is moving.

Example 92 includes the apparatus of examples 86 or 87, wherein the jump distance is a predetermined integer value not equal to zero.

Example 93 includes the apparatus of example 86, 87, or 92, including a plurality of multiplexors connecting the row jump register with each of the rows.

Example 94 one or more tangible, non-transitory computer readable media to implement image capture, including a plurality of instructions that, in response to being executed on an image sensor (204), cause the image sensor (204) to expose a plurality of rows of a pixel array (302) to the image. In some examples, the rows are exposed in a non-sequential, patterned order based on a jump distance, and read the rows of the pixel array (302) into a frame buffer memory (206), wherein the rows are read from in the non-sequential, patterned order based on the jump distance.

Example 95 includes the one or more tangible, non-transitory computer readable media of example 94. In some examples, the instructions, in response to being executed on a processor cause the processor to generate a reconstructed image by post-processing data about the image in the frame buffer memory.

Example 96 includes the one or more tangible, non-transitory computer readable media of example 95. In some examples, the image is reconstructed by generating a plurality of low resolution images from the read rows, one for each pass across the pixel array performed using the jump distance.

Example 97 includes the one or more tangible, non-transitory computer readable media of example 96. In some examples, the image is reconstructed by generating a plurality of original resolution images from the low resolution images, wherein an original resolution includes a resolution of the pixel array.

Example 98 includes an apparatus for capturing an image, the apparatus including means to expose a plurality of rows of a pixel array (302) to the image, wherein the rows are exposed in a non-sequential, patterned order based on a jump distance, and means to read the rows of the pixel array (302) into a frame buffer memory (206), wherein the rows are read from in the non-sequential, patterned order based on the jump distance.

Example 99 includes the apparatus of example 98, including means to generate a reconstructed image by post-processing data about the image in the frame buffer memory.

Example 100 includes the apparatus of example 99. In some examples, the image is reconstructed by means to generate a plurality of low resolution images from the read rows, one for each pass across the pixel array performed using the jump distance.

What is claimed is:
1. An apparatus for an image, comprising:
a pixel array;
a row jump register to:
 expose a plurality of rows of the pixel array to the image, wherein the rows are exposed in a non-sequential, patterned order based on a jump distance; and
 read the rows of the pixel array into a frame buffer memory, wherein the rows are read from in the non-sequential, patterned order based on the jump distance; and a processor to generate a reconstructed image by post-processing data about the image from the read rows in the frame buffer memory;
wherein the image is reconstructed by generating a plurality of low resolution images from the read rows, one for each pass across the pixel array performed using the jump distance; and
wherein the image is reconstructed by generating a plurality of original resolution images from the low resolution images, wherein an original resolution comprises a resolution of the pixel array.

2. The apparatus of claim 1, wherein the jump distance is based on whether a subject of the image is moving.

3. The apparatus of claim 1, wherein the jump distance is based on whether the apparatus is moving.

4. The apparatus of claim 1, wherein the jump distance is a predetermined integer value not equal to zero.

5. The apparatus of claim 1, wherein a value of the jump distance is varied.

6. The apparatus of claim 1, the row jump register to determine the jump distance based on one or more operating parameter.

7. One or more tangible, non-transitory computer readable media comprising a plurality of instructions that, in response to being executed on a processor, cause the processor to:
expose a plurality of rows of a pixel array to an image, wherein the rows are exposed in a non-sequential, patterned order based on a jump distance;
read the rows of the pixel array into a frame buffer memory, wherein the rows are read from in the non-sequential, patterned order based on the jump distance; and
generate a reconstructed image by post-processing data about the image in the frame buffer memory; wherein the image is reconstructed by generating a plurality of low resolution images from the read rows, one for each pass across the pixel array performed using the jump distance; and wherein the image is reconstructed by generating a plurality of original resolution images from the low resolution images, wherein an original resolution comprises a resolution of the pixel array.

8. The one or more tangible, non-transitory computer readable media of claim 7, wherein the jump distance is based on whether a subject of the image is moving.

9. The one or more tangible, non-transitory computer readable media of claim 7, wherein the jump distance is based on whether the image sensor is moving.

10. The one or more tangible, non-transitory computer readable media of claim 7, wherein the jump distance is a predetermined integer value not equal to zero.

11. The one or more tangible, non-transitory computer readable media of claim 7, wherein the jump distance is varied.

12. The one or more tangible, non-transitory computer readable media of claim 7, wherein the instructions, in response to being executed on a processor, cause the processor to determine the jump distance based on one or more operating parameter.

13. An image method, the method comprising:
exposing a plurality of rows of a pixel array to the image, wherein the rows are exposed in a non-sequential, patterned order based on a jump distance;
reading the rows of the pixel array into a frame buffer memory, wherein the rows are read from in the non-sequential, patterned order based on the jump distance; and
generating a reconstructed image by post-processing data about the image in the frame buffer memory;
wherein the image is reconstructed by generating a plurality of low resolution images from the read rows, one for each pass across the pixel array performed using the jump distance, and wherein the image is reconstructed by generating a plurality of original resolution images from the low resolution images, wherein an original resolution comprises a resolution of the pixel array.

14. The method of claim 13, comprising two dimensional jumping, wherein individual pixels are exposed and read out based on the jump distance and based on a column jump distance.

15. The method of claim 13, comprising determining the jump distance based on one or more operating parameter.

16. An apparatus for an image, comprising:
a pixel array; and
a row jump register to:
expose a plurality of rows of the pixel array to the image, wherein the rows are exposed in a non-sequential, patterned order based on a jump distance; and
read the rows of the pixel array into a frame buffer memory, wherein the rows are read from in the non-sequential, patterned order based on the jump distance;
wherein individual pixels are exposed and read out based on the jump distance and based on a column jump distance.

17. The apparatus of claim 16, comprising a processor to generate a reconstructed image by post-processing data about the image from the read rows in the frame buffer memory.

18. The apparatus of claim 17, wherein the image is reconstructed by generating a plurality of low resolution images from the read rows, one for each pass across the pixel array performed using the jump distance.

19. The apparatus of claim 18, wherein the image is reconstructed by generating a plurality of original resolution images from the low resolution images, wherein an original resolution comprises a resolution of the pixel array.

20. The apparatus of claim 16, wherein the jump distance is based on whether a subject of the image is moving.

21. The apparatus of claim 16, wherein the jump distance is based on whether the apparatus is moving.

22. The apparatus of claim 16, wherein the jump distance is a predetermined integer value not equal to zero.

23. The apparatus of claim 16, wherein a value of the jump distance is varied.

24. The apparatus of claim 16, the row jump register to determine the jump distance based on one or more operating parameter.

25. One or more tangible, non-transitory computer readable media comprising a plurality of instructions that, in response to being executed on a processor, cause the processor to:
expose a plurality of rows of a pixel array to an image, wherein the rows are exposed in a non-sequential, patterned order based on a jump distance;
read the rows of the pixel array into a frame buffer memory, wherein the rows are read from in the non-sequential, patterned order based on the jump distance; and
implement a two dimensional jumping, wherein individual pixels are exposed and read out based on the jump distance and based on a column jump distance.

26. The one or more tangible, non-transitory computer readable media of claim 25, wherein the instructions, in response to being executed on a processor, cause the processor to generate a reconstructed image by post-processing data about the image in the frame buffer memory.

27. The one or more tangible, non-transitory computer readable media of claim 26, wherein the image is reconstructed by generating a plurality of low resolution images from the read rows, one for each pass across the pixel array performed using the jump distance.

28. The one or more tangible, non-transitory computer readable media of claim 27, wherein the image is reconstructed by generating a plurality of original resolution images from the low resolution images, wherein an original resolution comprises a resolution of the pixel array.

29. The one or more tangible, non-transitory computer readable media of claim 25, wherein the jump distance is based on whether a subject of the image is moving.

30. The one or more tangible, non-transitory computer readable media of claim 25, wherein the jump distance is based on whether the image sensor is moving.

31. The one or more tangible, non-transitory computer readable media of claim 25, wherein the jump distance is a predetermined integer value not equal to zero.

32. The one or more tangible, non-transitory computer readable media of claim 25, wherein the jump distance is varied.

33. The one or more tangible, non-transitory computer readable media of claim 25, wherein the instructions, in response to being executed on a processor, cause the processor to determine the jump distance based on one or more operating parameter.

34. An image method, the method comprising: exposing a plurality of rows of a pixel array to the image, wherein the rows are exposed in a non-sequential, patterned order based on a jump distance; reading the rows of the pixel array into a frame buffer memory, wherein the rows are read from in the non-sequential, patterned order based on the jump distance; and implementing a two dimensional jumping, wherein individual pixels are exposed and read out based on the jump distance and based on a column jump distance.

35. The method of claim 34, comprising generating a reconstructed image by post-processing data about the image in the frame buffer memory.

36. The method of claim 35, wherein the image is reconstructed by generating a plurality of low resolution images from the read rows, one for each pass across the pixel array performed using the jump distance, and wherein the image is reconstructed by generating a plurality of original resolution images from the low resolution images, wherein an original resolution comprises a resolution of the pixel array.

37. The method of claim 34, comprising determining the jump distance based on one or more operating parameter.

* * * * *